United States Patent
Boos

(10) Patent No.: US 9,815,492 B2
(45) Date of Patent: Nov. 14, 2017

(54) METHOD AND DEVICE FOR CONTROLLING THE ARTICULATION ANGLE OF A BIG RIG

(71) Applicant: ROBERT BOSCH AUTOMOTIVE STEERING GMBH, Schwaebisch Gmuend (DE)

(72) Inventor: Nicolas Boos, Mutlangen (DE)

(73) Assignee: Robert Bosch Automotive Steering GmbH (DE)

( * ) Notice: Subject to any disclaimer, the term of this patent is extended or adjusted under 35 U.S.C. 154(b) by 76 days.

(21) Appl. No.: 14/718,535

(22) Filed: May 21, 2015

(65) Prior Publication Data

US 2015/0360718 A1  Dec. 17, 2015

(30) Foreign Application Priority Data

Jun. 17, 2014  (DE) .................. 10 2014 108 491

(51) Int. Cl.
   *B62D 6/00*  (2006.01)
   *B62D 13/06* (2006.01)

(52) U.S. Cl.
   CPC ............. *B62D 6/003* (2013.01); *B62D 13/06* (2013.01)

(58) Field of Classification Search
   CPC combination set(s) only.
   See application file for complete search history.

(56) References Cited

U.S. PATENT DOCUMENTS

| | | | | |
|---|---|---|---|---|
| 6,152,252 A * | 11/2000 | Pettersson | .......... | B60G 17/0162 180/282 |
| 8,527,124 B2 * | 9/2013 | Velde | .................. | B60L 3/104 701/22 |
| 8,825,328 B2 * | 9/2014 | Rupp | .................. | B62D 13/06 303/123 |
| 8,880,301 B2 * | 11/2014 | Velde | .................. | F16H 61/00 701/50 |
| 2001/0054524 A1* | 12/2001 | Masters | ............... | B62D 13/005 180/400 |
| 2002/0032509 A1* | 3/2002 | Akita | .................. | B62D 7/159 701/41 |
| 2005/0000738 A1* | 1/2005 | Gehring | ............ | B62D 15/0285 180/14.1 |
| 2008/0312792 A1* | 12/2008 | Dechamp | ............... | B62D 13/06 701/41 |
| 2009/0306854 A1* | 12/2009 | Dechamp | ............... | B62D 13/06 701/41 |
| 2011/0018231 A1* | 1/2011 | Collenberg | .............. | B60D 1/06 280/448 |

(Continued)

FOREIGN PATENT DOCUMENTS

EP  1 810 913  7/2007
EP  2 439 127  4/2012

*Primary Examiner* — Thomas G Black
*Assistant Examiner* — Ana Thomas
(74) *Attorney, Agent, or Firm* — Jordan and Koda, PLLC

(57) ABSTRACT

A method for controlling the articulation angle of a big rig, in which a first articulation angle control unit, which determines and controls a target wheel angle of at least one steerable wheel of the tractor unit so as to achieve a predefined target articulation angle of the big rig, is combined with a further articulation angle control unit for controlling the articulation angle with the first articulation angle control unit.

16 Claims, 3 Drawing Sheets

(56) References Cited

U.S. PATENT DOCUMENTS

| | | | |
|---|---|---|---|
| 2011/0040460 A1* | 2/2011 | Velde | B60L 3/104 |
| | | | 701/50 |
| 2014/0277941 A1* | 9/2014 | Chiu | B62D 13/06 |
| | | | 701/41 |
| 2016/0139599 A1* | 5/2016 | Czlapinski | G05D 1/0212 |
| | | | 701/41 |

* cited by examiner

METHOD AND DEVICE FOR CONTROLLING THE ARTICULATION ANGLE OF A BIG RIG

BACKGROUND OF THE INVENTION

The invention relates to a method for controlling the articulation angle of a big rig. The invention further relates to a device for controlling the articulation angle of a big rig.

A multitude of methods exist for controlling the articulation angle between the trailer and the tractor unit for backing up a big rig comprising a trailer. Using a suitable control algorithm, these methods generally determine a target wheel steering angle based on a predefined target articulation angle between the trader and the tractor unit, so as to arrive at the target articulation angle. This target wheel steering angle is then set by an appropriate steering system. Methods exist in which the front wheels of the tractor unit are steered, and methods also exist in which the rear wheels of the tractor unit are steered.

According to the methods described in EP 2 439 127 A1, US 2005/000738 A1 and EP 1 810 913 A1, the driver of a big rig comprising a trailer is assisted when backing up by the driver specifying the target articulation angle between the tractor unit and the trailer, which is then set by the steering system.

The known control algorithms for controlling the articulation angle in a big rig do not use the full potential of the steering angle as a controlled variable or must compromise when it comes to control quality and stability.

SUMMARY OF THE INVENTION

Therefore, it is the object of the present invention to create a method for controlling the articulation angle of a big rig, which in combination with an existing articulation angle control unit, fully exploits the potential of the steering angle as a controlled variable so as to follow the predefined target articulation angle more dynamically.

In addition to the existing articulation angle control unit, at least one second articulation angle control unit is operated in the method according to the invention. The second control unit can request the at least approximately maximal or at least one large target wheel angle for at least one steerable wheel. This not only fully exploits the full potential of the steering angle as a controlled variable so as to follow the predefined target articulation angle with maximum dynamics, but also improves the control quality, responsiveness and stability of the articulation angle control.

In one advantageous refinement of the invention, it may be provided that the at least one second articulation angle control unit requests a target wheel angle of more than 60% of the maximum wheel angle.

A typical wheel steering angle range, which is to say the angular range across which the wheel itself is rotated, can be 35° to 40°, for example. A typical steering angle range, which is to say the angular range across which the steering wheel is turned, can be 400° to 500°, for example.

The sign of the requested maximum or high target wheel angle can be determined according to the following method:

Control deviation articulation angle=target articulation angle−actual articulation angle IF driving direction==forward AND control deviation articulation angle>=0 THEN sign of wheel angle=positive ELSE_IF driving direction==forward AND control deviation articulation angle<0 THEN sign of wheel angle=negative ELSE_IF driving direction==reverse AND control deviation articulation angle<0 THEN sign of wheel angle=positive ELSE_IF driving direction==reverse AND control deviation articulation angle>=0 THEN sign of wheel angle=negative

IF_END

The target wheel angle of the existing articulation angle control unit (target wheel angle 1) and the target wheel angle of the second control unit (target wheel angle 2) can be set off according to the following method, as shown in FIG. 1, for the total target wheel angle requested during the steering event:

target wheel angle=factor*target wheel angle 1+(1−factor)*target wheel angle 2

The factor can be determined from the control deviation of the articulation angle, so that the factor is 1 for low control deviations of the articulation angle, and the factor is 0 for high articulation angle deviations. In the case of mean articulation angle deviations, the factor is changed from 1 to 0 as the articulation angle deviation increases. Accordingly, only the existing control unit becomes effective in the case of low articulation angle deviations, and only the second control unit becomes effective in the case of high articulation angle deviations. In the case of mean articulation angle deviations, both articulation angle control units act at an intensity that is dependent on the articulation angle deviation. A different calibration of the calculation of the factor is also conceivable, so that both control units are always effective, wherein the factor is not set entirely to 0 or 1. The ascertained target wheel angle 2 can be provided with the sign of the wheel angle (not shown).

The combination of the existing articulation angle control unit and the second control unit results in high dynamics and improved control quality, responsiveness and stability. In the case of high articulation angle deviations, the second control unit can request the full wheel angle and thus ensure that the control deviation is reduced as quickly as possible. After the rapid reduction of the control deviation, the second control unit can be superimposed on the first control unit, which then precisely sets the target articulation angle. The existing articulation angle control unit can be designed entirely with control quality and responsiveness in mind, since it is no longer required to achieve high dynamics. The behavior of the combined control unit can be easily set via the parameterization of the individual control units and the calculation rule of the factor. Using the existing control unit, the control quality and responsiveness are set; using the second control unit, the dynamics is set; and using the calculation rule of the factor, the stability is set.

One embodiment of the invention will be described based on the figures by way of example.

DETAILED DESCRIPTION OF THE PREFERRED EMBODIMENTS

Figure 1:
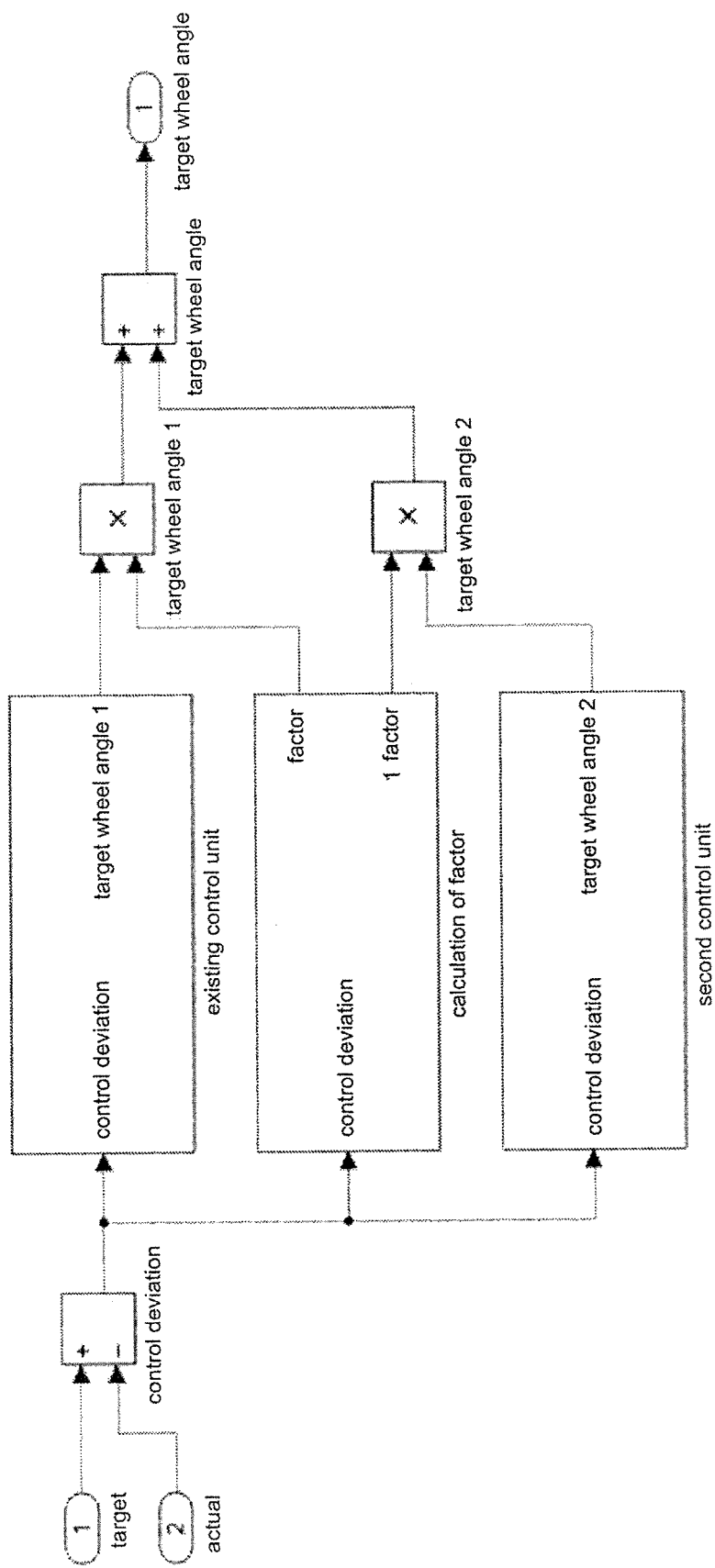
FIG. 1 shows a block diagram of a combined control unit according to the invention.

The block diagram of FIG. 1 shows one option for implementing a combined control unit according to the invention, in which at least one second articulation angle control unit is provided, in addition to the first articulation angle control unit, for controlling the articulation angle of a big rig (not shown). The big rig can comprise a tractive motor vehicle having at least one trailer, for example. The first articulation angle control unit can be used to determine and control a target wheel angle of at least one steerable wheel of the tractor unit so as to achieve a predefined target articulation angle of the big rig. It is moreover also possible to use more than two control units.

Figure 2:
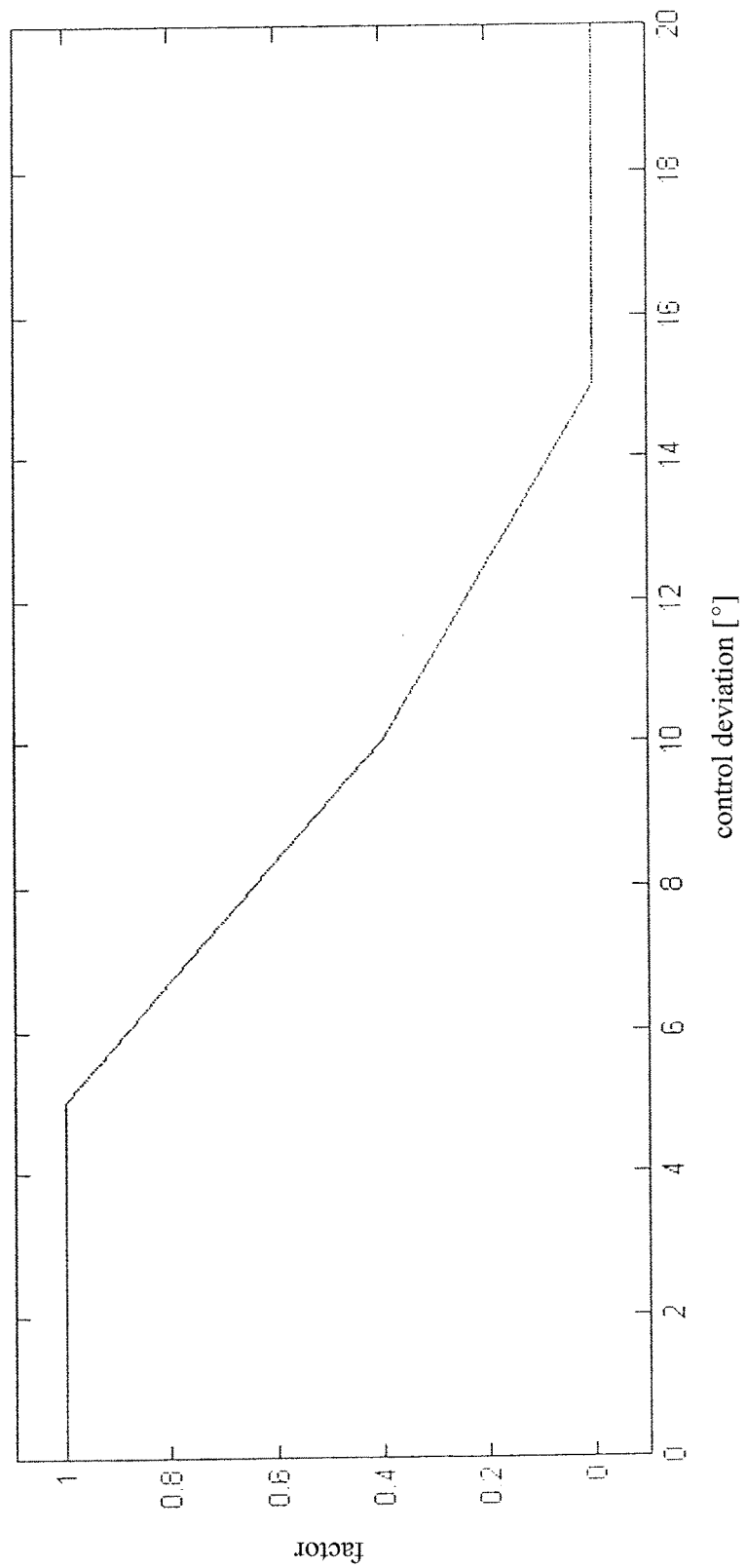
FIG. 2 shows an exemplary calculation of the factor by way of characteristic curve.

So as to ascertain the characteristic curve shown in FIG. 2, for example, so as to calculate the factor, y values (factors) for several x interpolation points (control deviation) can be predefined, between which a suitable interpolation is carried out, for example in a linear manner or in another suitable manner. In this way, the factor for the "combination" of the first and second control units can be derived.

Figure 3:
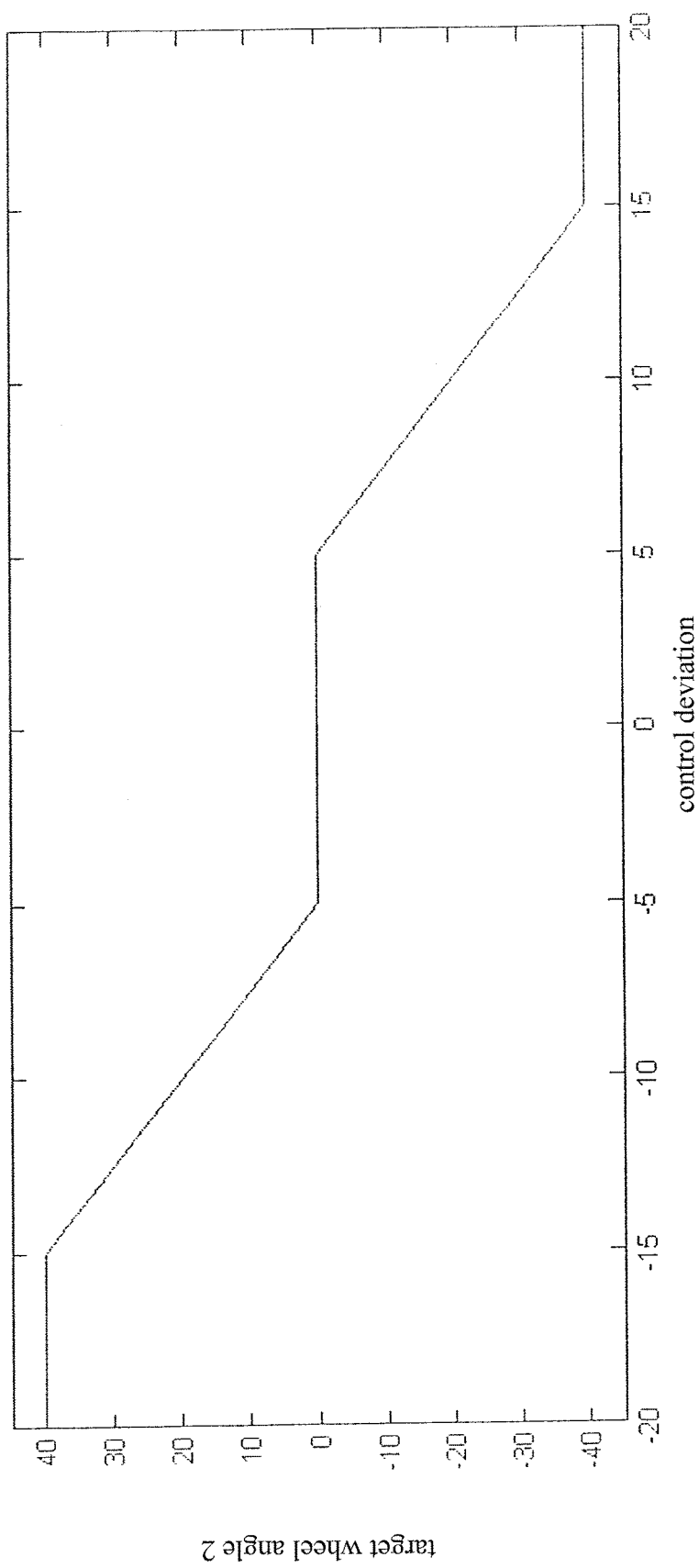
FIG. 3 shows an exemplary calculation of the second control unit (reverse), wherein a sign of the wheel angle has already been taken into consideration.

FIG. 3 shows a characteristic curve for an exemplary calculation of the second control unit while backing up. A sign of the wheel angle while backing up has already been taken into consideration. However, the described articulation angle control is also useful when driving forward. The sign wheel angle is "multiplied by +1 or −1" in the second control unit for this purpose.

The invention claimed is:

1. A method for controlling an actual articulation angle between a tractor and at least one trailer to change toward a target articulation angle between said tractor and said at least one trailer, the tractor and at least one trailer forming a big rig, the actual articulation angle being controlled by adjusting a wheel angle of a steerable wheel of the tractor, the method comprising:
    deriving with a first control unit a first target wheel angle for said steerable wheel;
    deriving with a second control unit a second target wheel angle for said steerable wheel;
    applying a first factor to the first target wheel angle to achieve first-factored target wheel angle;
    applying a second factor to said second target wheel angle to achieve a second-factored target wheel angle;
    combining the first-factored target wheel angle and the second-factored target wheel angle to achieve a total target wheel angle for said steerable wheel; and
    adjusting the wheel angle of said steerable wheel toward said total target wheel angle to change said actual articulation angle between said tractor and said at least one trailer toward said target articulation angle.

2. The method according to claim 1, wherein said applying said second factor comprises setting the second-factored target wheel angle to be more than 60% of a maximum wheel angle of said steerable wheel.

3. The method according to claim 1, wherein said applying said second factor comprises setting the second-factored target wheel angle to be approximately a maximum target wheel angle of said steerable wheel.

4. The method according to claim 1, wherein a sign of the total target wheel angle is derived as follows:
    when a driving direction of the big rig is forward and the control deviation is >=0, a positive sign is used for the total target wheel angle;
    when the driving direction of the big rig is forward and the control deviation is <0, a negative sign is used for the total target wheel angle;
    when the driving direction of the big rig is reverse and the control deviation is <0, a positive sign is used for the total target wheel angle; and
    when the driving direction of the big rig is reverse and the control deviation is >=0, a negative sign is used for the total target wheel angle.

5. The method according to claim 1, wherein the first factor is between 0 and 1, inclusive, and the second factor equals 1 minus the first factor.

6. The method according to claim 1, wherein each one of the first target wheel angle and the second target wheel angle are determined based on a control deviation, which equals said target articulation angle minus said actual articulation angle.

7. A method for controlling an actual articulation angle between a tractor and at least one trailer to change toward a target articulation angle between said tractor and said at least one trailer, the tractor and at least one trailer forming a big rig, the actual articulation angle being controlled by adjusting a wheel angle of a steerable wheel of the tractor, the method comprising:
    deriving with a first control unit a first target wheel angle for said steerable wheel;
    deriving with a second control unit a second target wheel angle for said steerable wheel;
    applying a first factor to the first target wheel angle to achieve a first-factored target wheel angle;
    applying a second factor to said second target wheel angle to achieve a second-factored target wheel angle;
    combining the first-factored target wheel angle and the second-factored target wheel angle to achieve a total target wheel angle for said steerable wheel; and
    adjusting the wheel angle of said steerable wheel toward said total target wheel angle to change said actual articulation angle between said tractor and said at least one trailer toward said target articulation angle; and
    wherein the first factor and the second factor are determined based on a control deviation, which equals said target articulation angle minus said actual articulation angle.

8. The method according to claim 7, wherein the first factor is 1 when said control deviation is within a first range, and wherein the first factor is 0 when said control deviation is within a second non-overlapping range greater than said first range, and the first factor is changed from 1 to 0 for average articulation angle deviations as said control deviation increases within a third range between said first range and said second range.

9. The method according to claim 7, wherein the first factor is between 0 and, inclusive, and the second factor equals 1 minus the first factor.

10. The method according to claim 7, wherein each one of the first target wheel angle and the second target wheel angle are determined based on a control deviation, which equals said target articulation angle minus said actual articulation angle.

11. A method for controlling an actual articulation angle between a tractor and at least one trailer to change toward a target articulation angle between said tractor and said at least one trailer, the tractor and at least one trailer forming a big rig, the actual articulation angle being controlled by adjusting a wheel angle of a steerable wheel of the tractor, the method comprising:

deriving with a first control unit a first target wheel angle for said steerable wheel;

deriving with a second control unit a second target wheel angle for said steerable wheel;

applying a first factor to the first target wheel angle to achieve first weighted target wheel angle, wherein the first factor is between 0 and 1, inclusive;

applying a second factor to said second target wheel angle to achieve a second weighted target wheel angle, wherein the second factor equals 1 minus the first factor;

summing the first-factored target wheel angle and the second-factored target wheel angle to achieve a total target wheel angle for said steerable wheel; and adjusting the wheel angle of said steerable wheel toward said total target wheel angle to change said actual articulation angle between said tractor and said at least one trailer toward said target articulation angle.

12. The method of claim 11, wherein the first factor and the second factor are determined based on a control deviation, which equals said target articulation angle minus said actual articulation angle.

13. The method according to claim 11, wherein each one of the first target wheel angle and the second target wheel angle are determined based on a control deviation, which equals said target articulation angle minus said actual articulation angle.

14. The method according to claim 11, wherein applying said second factor comprises setting the second weighted target wheel angle to be more than 60% of a maximum wheel angle of said steerable wheel.

15. The method according to claim 11, wherein said applying said second factor comprises setting the second weighted target wheel angle to be approximately a maximum target wheel angle of said steerable wheel.

16. The method according to claim 11, wherein a sign of the total target wheel angle is derived as follows:

when a driving direction of the big rig is forward and the control deviation is >=0, a positive sign is used for the total target wheel angle;

when the driving direction of the big rig is forward and the control deviation is <0, a negative sign is used for the total target wheel angle;

when the driving direction of the big rig is reverse and the control deviation is <0, a positive sign is used for the total target wheel angle; and when the driving direction of the big rig is reverse and the control deviation is >=0, a negative sign is used for the total target wheel angle.

\* \* \* \* \*